(12) United States Patent
Ai et al.

(10) Patent No.: US 11,613,437 B2
(45) Date of Patent: Mar. 28, 2023

(54) ARRANGEMENT STRUCTURE OF A STACKER DEVICE

(71) Applicant: CISDI ENGINEERING CO., LTD, Chongqing (CN)

(72) Inventors: Yu Ai, Chongqing (CN); Shang Lun Chen, Chongqing (CN)

(73) Assignee: CISDI ENGINEERING CO., LTD, Chongqing (CN)

(*) Notice: Subject to any disclaimer, the term of this patent is extended or adjusted under 35 U.S.C. 154(b) by 0 days.

(21) Appl. No.: 15/696,864

(22) Filed: Sep. 6, 2017

(65) Prior Publication Data

US 2017/0362043 A1    Dec. 21, 2017

Related U.S. Application Data

(63) Continuation of application No. PCT/CN2016/092927, filed on Aug. 2, 2016.

(30) Foreign Application Priority Data

Aug. 4, 2015 (CN) .......................... 201510471580.7

(51) Int. Cl.
B65G 65/28 (2006.01)

(52) U.S. Cl.
CPC .................................. *B65G 65/28* (2013.01)

(58) Field of Classification Search
CPC .................................................... B65G 65/28
See application file for complete search history.

(56) References Cited

U.S. PATENT DOCUMENTS

| 3,586,152 A | * | 6/1971 | Austin | B65G 65/28 |
| | | | | 198/508 |
| 3,826,385 A | * | 7/1974 | Bluntzer | B65G 65/28 |
| | | | | 414/294 |

FOREIGN PATENT DOCUMENTS

| CN | 204823301 U | * | 12/2015 | |
| DE | 9404173 U1 | * | 5/1994 | ............ B65G 65/06 |
| DE | 102014107813 A1 | * | 12/2015 | ............ B65G 65/28 |
| JP | 60148804 A | * | 8/1985 | ............ B65G 65/28 |
| WO | WO-0046131 A1 | * | 8/2000 | ............ B65G 65/06 |
| WO | WO-2009069946 A2 | * | 6/2009 | ............... B65G 3/02 |

OTHER PUBLICATIONS

"Patent Translate CN204823301", EPO and Google. (Year: 2018).*
"Patent Translate DE102014107813", EPO and Google. (Year: 2018).*

* cited by examiner

*Primary Examiner* — Mark A Deuble
(74) *Attorney, Agent, or Firm* — Michael D. Eisenberg

(57) ABSTRACT

An arrangement structure of a stacker and a reclaimer, comprises a stacker, a reclaimer, a stacker travelling track, a reclaimer travelling track, a material input conveyor, a material output conveyor, a material storage yard, and a closed material storage shed. The stacker and the material input conveyor are inside the reclaimer, and the reclaimer upwards straddles the stacker and the material input conveyor. The stacker and the material input conveyor penetrate through an internal space of the reclaimer. An arrangement form that a rack of the reclaimer upwards straddles the stacker is adopted so that a problem of interference caused when the stacker is as high as an upper travelling platform of the reclaimer is solved. The upper travelling platform of the reclaimer does not need to be independently arranged.

17 Claims, 4 Drawing Sheets

ARRANGEMENT STRUCTURE OF A STACKER DEVICE

CROSS-REFERENCE TO RELATED APPLICATIONS

This is a continuing application, under 35 U.S.C. § 120, of copending international application No. PCT/CN2016/092927, filed Aug. 2, 2016, which designated the United States and was not published in English; this application also claims the priority, under 35 U.S.C. § 119, of China patent application No. 201510471580.7, filed on Aug. 4, 2015, the prior applications are herewith incorporated by reference in their entireties.

STATEMENT REGARDING FEDERALLY SPONSORED RESEARCH OR DEVELOPMENT

Not Applicable

FIELD OF THE INVENTION

The present invention relates to the field of storage and conveying facilities of bulk material, and particularly relates to an arrangement structure of a stacker and a reclaimer.

BACKGROUND OF THE INVENTION

In an existing arrangement structure of a stacker and a reclaimer, to avoid generating a cross-interference phenomenon for a stacker and a reclaimer in space, the stacker is designed outside the reclaimer and an upper travelling platform of the reclaimer is often individually arranged, causing an increase of civil engineering quantity, poor stress rationality of the upper travelling platform of the reclaimer and a supporting structure thereof, narrow space of the travelling platform and difficult maintenance of a travelling device. In addition, to avoid the upper travelling platform of the reclaimer, the material stacking height is limited, and the internal space of the material storage yard cannot be fully used.

As shown in FIG. 1, a prior art arrangement mode of a stacker and a reclaimer is as follows: to avoid generating a cross-interference phenomenon for a stacker and a reclaimer in space, the stacker 1 is designed outside the reclaimer 3 and an upper travelling platform 7 of the reclaimer is individually arranged under a travelling platform 6 of the stacker, causing an increase of civil engineering quantity, narrow space of the upper travelling platform 7 of the reclaimer and difficult maintenance of a travelling device. In addition, to avoid the upper travelling platform 7 of the reclaimer, the material stacking height is limited, and the internal space of the material storage yard cannot be fully used.

SUMMARY OF THE INVENTION

In view of the above defects in the prior art, the purpose of the present invention is to provide an arrangement structure of a stacker and a reclaimer to solve a problem of interference caused when the travelling platform of the stacker is as high as the upper travelling platform of the reclaimer.

To achieve the above purpose and other related purposes, the present invention provides an arrangement structure of a stacker and a reclaimer, comprising a stacker, a reclaimer, a stacker travelling track, a reclaimer travelling track, a material input conveyor, a material output conveyor, a material storage yard and a closed material storage shed, wherein the stacker and the material input conveyor are located inside the reclaimer, and the reclaimer upwards straddles the stacker and the material input conveyor.

Through adoption of the above structure, the reclaimer upwards straddles the stacker and the material input conveyor, thereby avoiding cross-interference in a travelling process of the stacker and the reclaimer, increasing a travelling space-enhancing stress rationality of the upper travelling platform of the reclaimer and the supporting structure thereof, bringing more convenient repair and maintenance for the travelling device of the reclaimer, avoiding loss of a stock pile volume caused by avoiding the upper travelling platform of the reclaimer in an existing arrangement form, increasing a utilization rate of the internal space of the material storage yard and reducing civil engineering quantity.

Preferably, the reclaimer travelling track comprises an upper travelling track of the reclaimer and a lower travelling track of the reclaimer; and the upper travelling track of the reclaimer and the stacker travelling track are arranged on a same platform or respectively arranged on an upper platform and a lower platform. The upper travelling track of the reclaimer and the stacker travelling track can be identical or different in height.

Preferably, at least two groups of stacker travelling tracks are arranged; the stackers are arranged on the stacker travelling tracks; each stacker is correspondingly provided with a material input conveyor; the upper travelling track of the reclaimer is arranged between the stacker travelling tracks; and the reclaimer straddles the stacker and the material input conveyor on the same side.

Preferably, a main frame of the reclaimer straddles the stacker and the material input conveyor; and an upper end and a lower end of the main frame are respectively supported on the upper travelling track of the reclaimer and the lower travelling track of the reclaimer.

Preferably, the main frame comprises a vertical frame, an arch frame and an inclined frame connected sequentially; the vertical frame is supported on the upper travelling track of the reclaimer; the arch frame straddles above the stacker and the material input conveyor; and the inclined frame is supported on the lower travelling track of the reclaimer.

Preferably, the main frame has an arch shape or an inverted U shape.

Preferably, the lower travelling track of the reclaimer and the material output conveyor are arranged at a side edge of the material storage yard.

Preferably, the closed material storage shed is fully closed by a surface of a wall or closed by a windshield wall, a windshield plate and a windproof net with an aperture ratio.

Preferably, the arrangement structure of the stacker and the reclaimer further comprises a power supply and lighting system, a dust suppression system, a fire fighting system, a ventilating system, a daylighting and heating system and an auxiliary water supply and drainage system.

An arrangement structure of a stacker and a reclaimer comprises a stacker, a reclaimer, a stacker travelling track, a reclaimer travelling track, a material input conveyor, a material output conveyor, a material storage yard and a closed material storage shed, wherein the stacker and the material input conveyor are located inside the reclaimer, and the reclaimer upwards straddles the stacker and the material input conveyor. The stacker and the material input conveyor in the present invention penetrate through an internal space of the reclaimer. An arrangement form that a rack of the reclaimer upwards straddles the stacker is adopted, so that a problem of interference caused when the stacker is as high as an upper travelling platform of the reclaimer is solved. The upper travelling platform of the reclaimer does not need to be independently arranged, and the travelling device is more convenient to repair and maintain. Meanwhile, loss of a stockpile volume caused by avoiding the upper travelling platform of the reclaimer in an existing technological arrangement form is prevented; a utilization rate of the internal space of the material storage yard is increased; civil engineering quantity is reduced; economic benefits are obvious; and engineering application values are great.

As mentioned above, the present invention has the following beneficial effects:

1. The present invention can solve the problem of interference caused when the stacker is as high as a supporting platform of the upper travelling track of the reclaimer; the supporting platform of the upper travelling track of the reclaimer does not need to be individually arranged; the stress performance of the supporting platform of the upper travelling track of the reclaimer and the supporting structure is more reasonable; civil engineering quantity is reduced; and investment is decreased.

2. The present invention can avoid loss of a stock pile volume caused by avoiding the supporting platform of the upper travelling track of the reclaimer in a material stacking process of an existing storage arrangement form, and can obviously increase a utilization rate of the internal space of the material storage yard.

3. The present invention ensures a larger repair and maintenance space of the upper travelling device of the reclaimer, and makes repair and maintenance easier.

Although the systems, apparatuses, and methods are illustrated and described herein as embodied in an arrangement structure of a stacker and a reclaimer, it is, nevertheless, not intended to be limited to the details shown because various modifications and structural changes may be made therein without departing from the spirit of the invention and within the scope and range of equivalents of the claims. Additionally, well-known elements of exemplary embodiments will not be described in detail or will be omitted so as not to obscure the relevant details of the systems, apparatuses, and methods.

Additional advantages and other features characteristic of the systems, apparatuses, and methods will be set forth in the detailed description that follows and may be apparent from the detailed description or may be learned by practice of exemplary embodiments. Still other advantages of the systems, apparatuses, and methods may be realized by any of the instrumentalities, methods, or combinations particularly pointed out in the claims.

Other features that are considered as characteristic for the systems, apparatuses, and methods are set forth in the appended claims. As required, detailed embodiments of the systems, apparatuses, and methods are disclosed herein; however, it is to be understood that the disclosed embodiments are merely exemplary of the systems, apparatuses, and methods, which can be embodied in various forms. Therefore, specific structural and functional details disclosed herein are not to be interpreted as limiting, but merely as a basis for the claims and as a representative basis for teaching one of ordinary skill in the art to variously employ the systems, apparatuses, and methods in virtually any appropriately detailed structure. Further, the terms and phrases used herein are not intended to be limiting; but rather, to provide an understandable description of the systems, apparatuses, and methods. While the specification concludes with claims defining the systems, apparatuses, and methods of the invention that are regarded as novel, it is believed that the systems, apparatuses, and methods will be better understood from a consideration of the following description in conjunction with the drawing figures, in which like reference numerals are carried forward.

BRIEF DESCRIPTION OF THE DRAWINGS

The accompanying figures, where like reference numerals refer to identical or functionally similar elements throughout the separate views, which are not true to scale, and which, together with the detailed description below, are incorporated in and form part of the specification, serve to illustrate further various embodiments and to explain various principles and advantages all in accordance with the systems, apparatuses, and methods. Advantages of embodiments of the systems, apparatuses, and methods will be apparent from the following detailed description of the exemplary embodiments thereof, which description should be considered in conjunction with the accompanying drawings in which.

Figure 1:
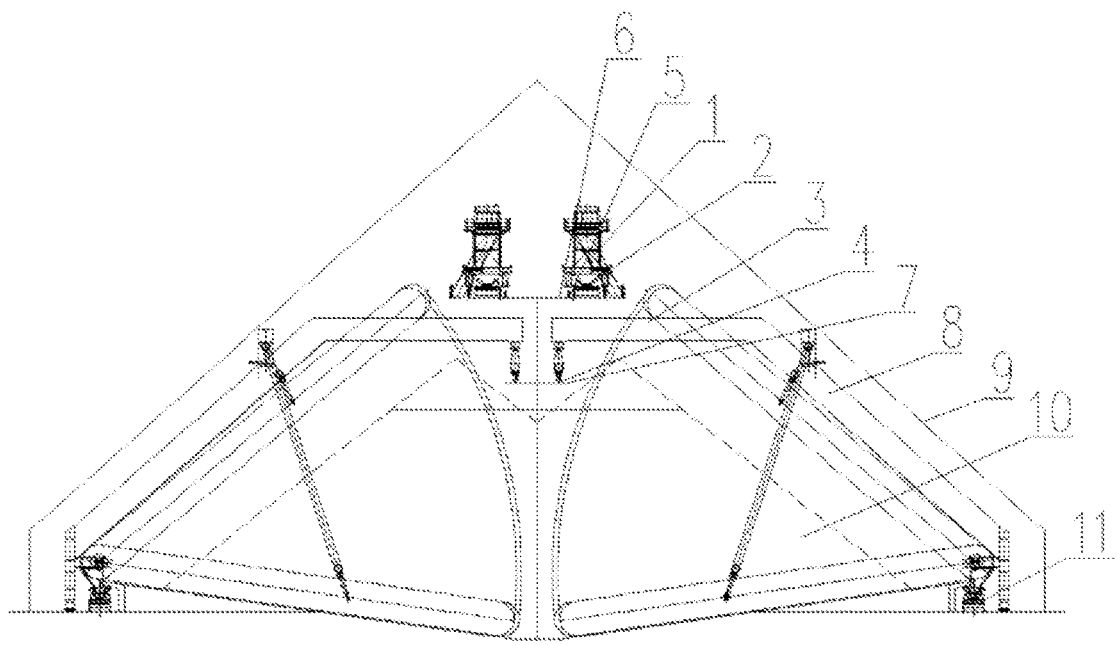
FIG. 1 is a structural schematic diagram of a prior art stacking and reclaiming system.

DESCRIPTION OF PART MARKS 1 stacker
2 material input conveyor
3 reclaimer
4 upper travelling track of reclaimer
5 stacker travelling track
6 stacker travelling platform
7 upper travelling platform of reclaimer
8 main frame
9 closed material storage shed
10 material storage yard
11 material output conveyor
12 lower travelling track of reclaimer

DETAILED DESCRIPTION OF THE EMBODIMENTS

As required, detailed embodiments of the systems, apparatuses, and methods are disclosed herein; however, it is to be understood that the disclosed embodiments are merely exemplary of the systems, apparatuses, and methods, which can be embodied in various forms. Therefore, specific structural and functional details disclosed herein are not to be interpreted as limiting, but merely as a basis for the claims and as a representative basis for teaching one skilled in the art to variously employ the systems, apparatuses, and methods in virtually any appropriately detailed structure. Further, the terms and phrases used herein are not intended to be limiting; but rather, to provide an understandable description of the systems, apparatuses, and methods. While the specification concludes with claims defining the features of the systems, apparatuses, and methods that are regarded as novel, it is believed that the systems, apparatuses, and methods will be better understood from a consideration of the following description in conjunction with the drawing figures, in which like reference numerals are carried forward.

In the following detailed description, reference is made to the accompanying drawings which form a part hereof, and in which are shown by way of illustration embodiments that may be practiced. It is to be understood that other embodiments may be utilized and structural or logical changes may be made without departing from the scope. Therefore, the following detailed description is not to be taken in a limiting sense, and the scope of embodiments is defined by the appended claims and their equivalents.

Alternate embodiments may be devised without departing from the spirit or the scope of the invention. Additionally, well-known elements of exemplary embodiments of the systems, apparatuses, and methods will not be described in detail or will be omitted so as not to obscure the relevant details of the systems, apparatuses, and methods.

Before the systems, apparatuses, and methods are disclosed and described, it is to be understood that the terminology used herein is for the purpose of describing particular embodiments only and is not intended to be limiting. The terms "comprises," "comprising," or any other variation thereof are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element. The terms "including" and/or "having," as used herein, are defined as comprising (i.e., open language). The terms "a" or "an", as used herein, are defined as one or more than one. The term "plurality," as used herein, is defined as two or more than two. The term "another," as used herein, is defined as at least a second or more. The description may use the terms "embodiment" or "embodiments," which may each refer to one or more of the same or different embodiments.

The terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact (e.g., directly coupled). However, "coupled" may also mean that two or more elements are not in direct contact with each other, but yet still cooperate or interact with each other (e.g., indirectly coupled).

Relational terms such as first and second, top and bottom, and the like may be used solely to distinguish one entity or action from another entity or action without necessarily requiring or implying any actual such relationship or order between such entities or actions. The description may use perspective-based descriptions such as up/down, back/front, top/bottom, and proximal/distal. Such descriptions are merely used to facilitate the discussion and are not intended to restrict the application of disclosed embodiments. Various operations may be described as multiple discrete operations in turn, in a manner that may be helpful in understanding embodiments; however, the order of description should not be construed to imply that these operations are order dependent.

Herein various embodiments of the systems, apparatuses, and methods are described. In many of the different embodiments, features are similar. Therefore, to avoid redundancy, repetitive description of these similar features may not be made in some circumstances. It shall be understood, however, that description of a first-appearing feature applies to the later described similar feature and each respective description, therefore, is to be incorporated therein without such repetition.

Described now are exemplary embodiments.

Embodiment 1

Figure 2:
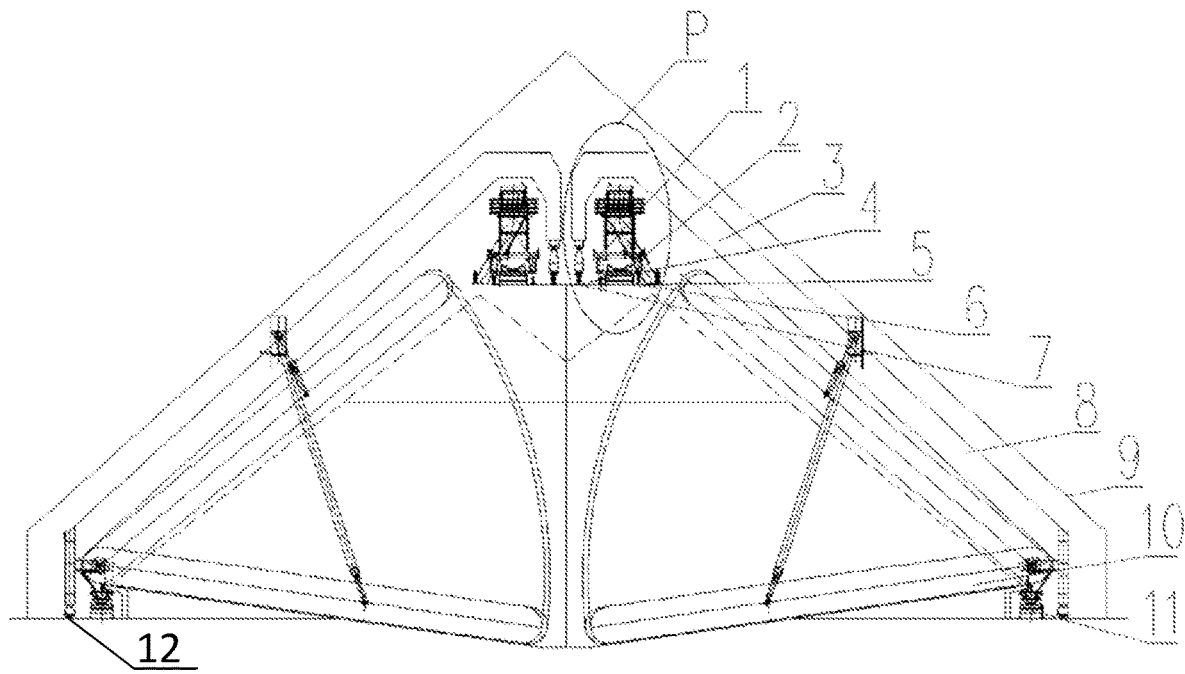
FIG. 2 is a schematic diagram of an exemplary embodiment of an arrangement structure of a stacker and a reclaimer.
Figure 3:
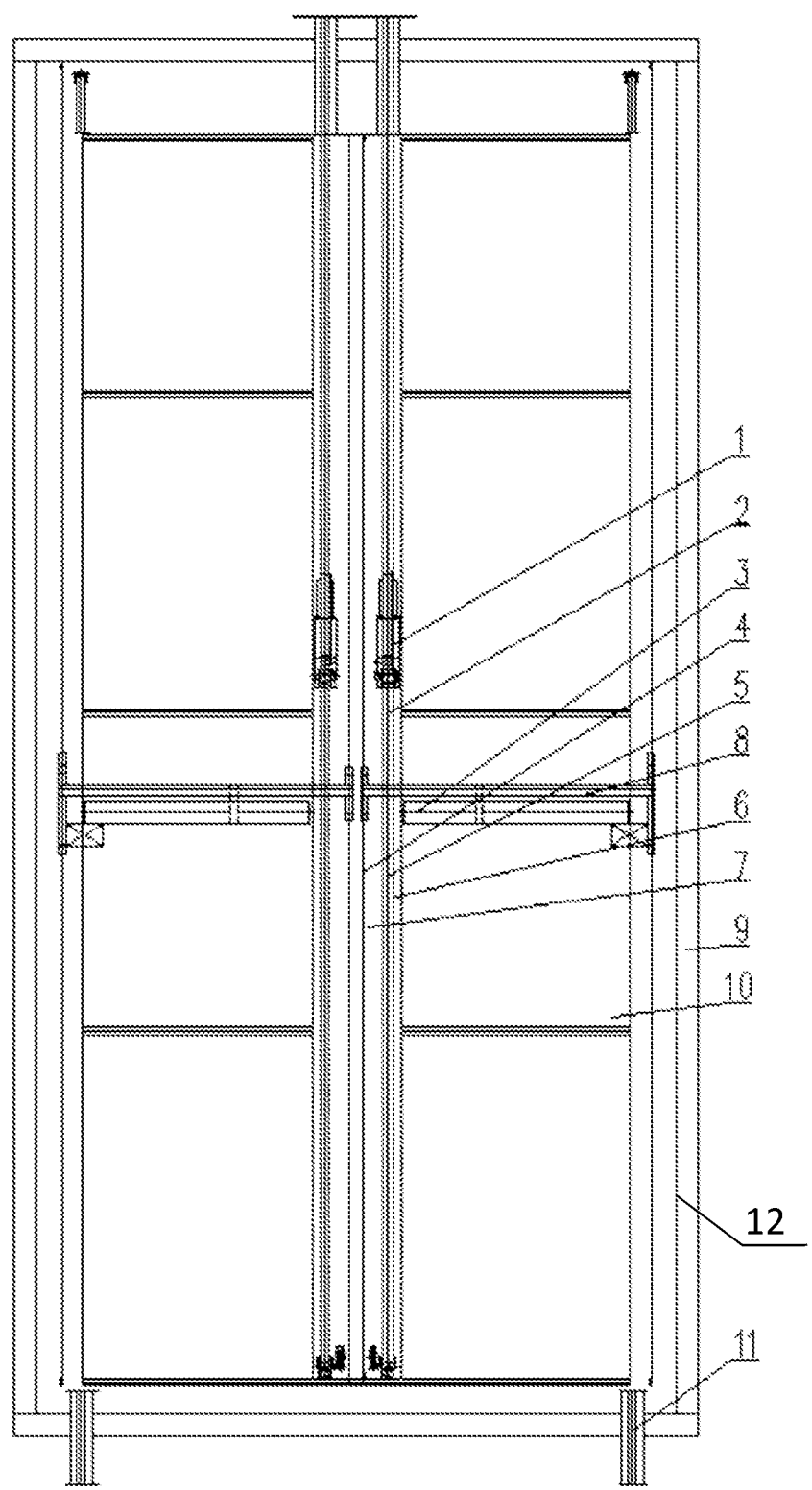
FIG. 3 is a top plan view of the arrangement structure of FIG. 2.
Figure 4:
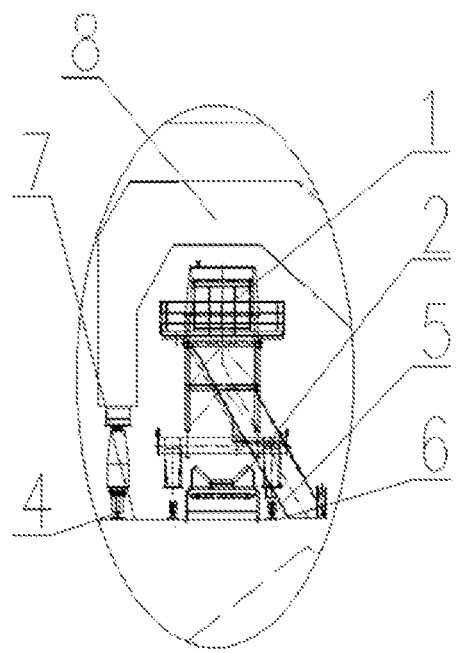
FIG. 4 is a partial and enlarged view of a portion P of the arrangement structure of FIG. 2.

Referring now to the figures of the drawings in detail and first, particularly to FIGS. 2 to 4, there is shown a first exemplary embodiment of an arrangement structure of a stacker and a reclaimer, comprising a stacker 1, a reclaimer 3, a stacker travelling track 5, a reclaimer travelling track, a material input conveyor 2, a material output conveyor 11, a material storage yard 10 and a closed material storage shed 9, wherein the reclaimer travelling track comprises an upper travelling track 4 of the reclaimer and a lower travelling track 12 of the reclaimer. In the present embodiment, the upper travelling track 4 of the reclaimer and the stacker travelling track 5 are arranged on the same platform, i.e., the stacker travelling platform 6 and the upper travelling platform 7 of the reclaimer are the same platform; and the lower travelling track 12 of the reclaimer and the material output conveyor 11 are arranged at a side edge of the material storage yard 10.

A left group and a right group of stacker travelling tracks 5 are arranged. The stackers 1 are arranged on the stacker travelling tracks 5. Each stacker 1 is correspondingly provided with a material input conveyor 2. The upper travelling track 4 of the reclaimer is arranged between the two stacker travelling tracks 5. The reclaimer 3 straddles the stacker 1 and the material input conveyor 2 on the same side. The stacker 1 and the material input conveyor 2 are located inside the reclaimer 3.

The main frame 8 of the reclaimer 3 straddles the stacker 1 and the material input conveyor 2. The main frame 8 comprises a vertical frame, an arch frame, and an inclined frame connected sequentially. The vertical frame is supported on the upper travelling track 4 of the reclaimer. The arch frame straddles above the stacker 1 and the material input conveyor 2. The inclined frame is supported on the lower travelling track 12 of the reclaimer. The main frame 8 has an arch shape or an inverted U shape in other embodiments as long as the frame can straddle above the stacker 1 and the material input conveyor 2 and no interference is generated during stacking.

The closed material storage shed 9 is fully closed by a surface of a wall or closed by a wind-shield wall, a wind-shield plate, and a windproof net with an aperture ratio. The arrangement structure of the stacker and the reclaimer further comprises a power supply and lighting system, a dust suppression system, a fire fighting system, a ventilating system, a daylighting and heating system, and an auxiliary water supply and drainage system, which belongs to the prior art and will not be repeated herein.

According to different arrangement structures within the yard, only one group of stacker 1 and stacker travelling track 5 can also be arranged. Meanwhile, one group of reclaimer 3 and upper travelling track 4 of the reclaimer can be correspondingly arranged and the reclaimer 3 straddles above the stacker 1 and the stacker travelling track 5.

Figure 5:
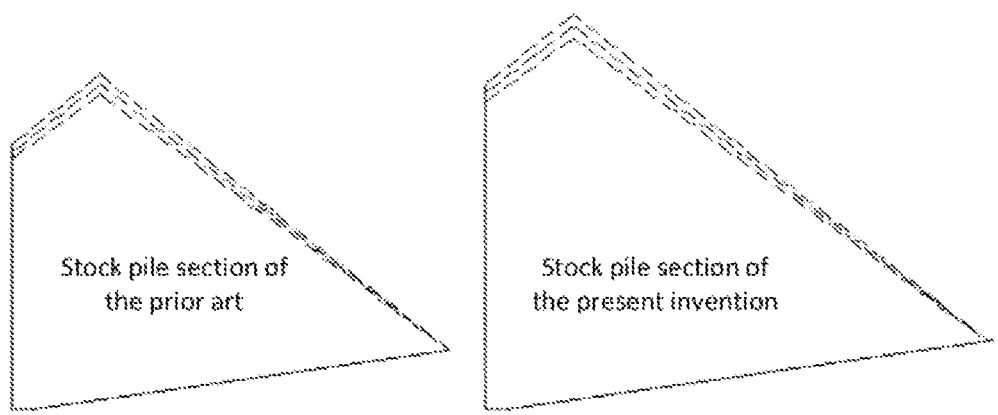
FIG. 5 is a comparison diagram of a prior art stacking and reclaiming system and a stockpile cross-section formed by the arrangement structure of FIG. 2 through adoption of same parameters.

It can be seen from FIG. 5 that, under the same technological arrangement, the arrangement structure of the stacker and the reclaimer can be adopted to effectively avoid loss of a stock pile volume caused by avoiding the upper travelling platform of the reclaimer in an existing storage arrangement form, and can obviously increase a utilization rate of the internal space of the material storage yard.

Embodiment 2

Figure 6:
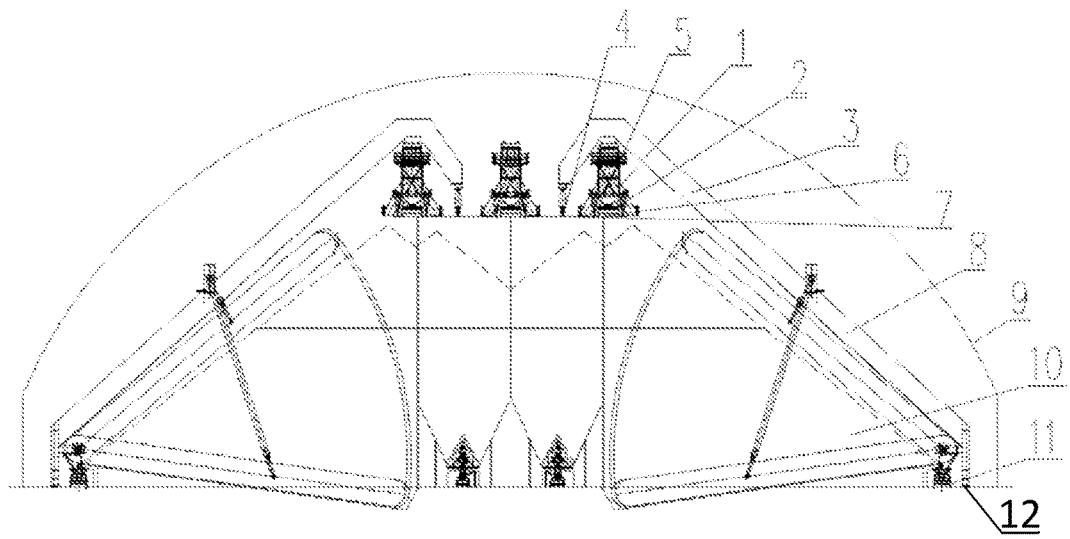
FIG. 6 is a structural schematic diagram of another exemplary embodiment of an arrangement structure of a stacker and a reclaimer.

FIG. 6 illustrates a second exemplary embodiment of an arrangement structure of a stacker and a reclaimer, the difference between the second embodiment and the first embodiment above is that: the number of channels of stacking and reclaiming is increased; the stacker travelling tracks 5 are increased to three channels; the upper travelling track 4 of the reclaimer is located between two adjacent stacker travelling tracks 5; and two reclaimers 3 respectively straddle the stacker 1 and the stacker travelling tracks 5 on the same side.

Embodiment 3

Figure 7:
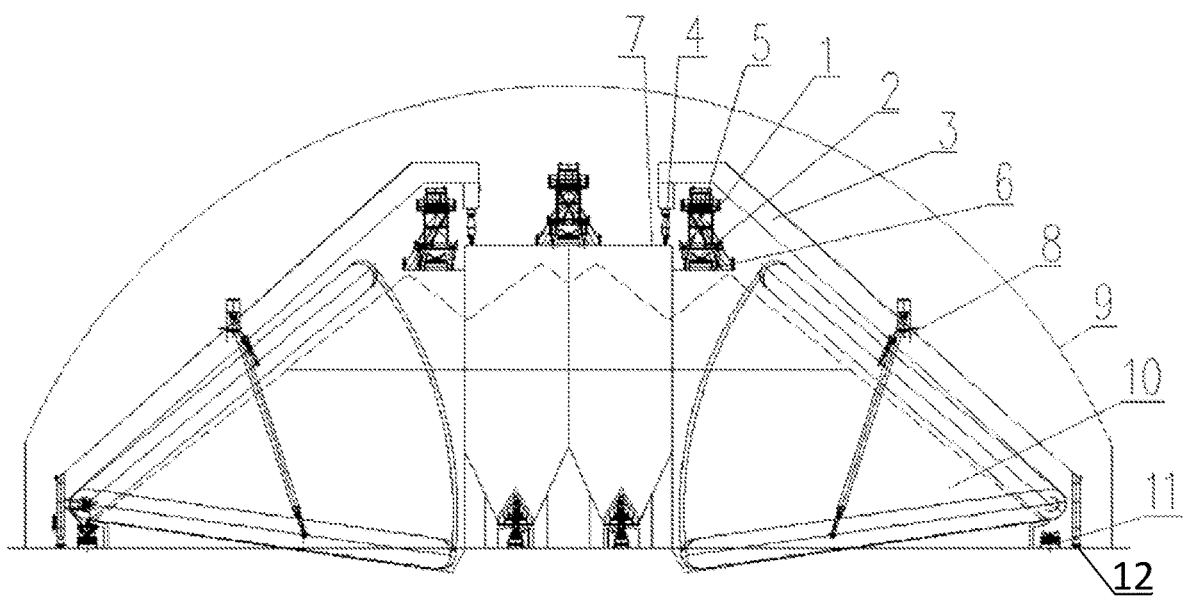
FIG. 7 is a structural schematic diagram of a further exemplary embodiment of an arrangement structure of a stacker and a reclaimer.

FIG. 7 illustrates a third exemplary embodiment of an arrangement structure of a stacker and a reclaimer, the difference between the third embodiment and the second embodiment of the arrangement structure of the stacker and the reclaimer is that: the upper travelling track 4 of the reclaimer and the stacker travelling track 5 are installed on platforms of different heights and the height of the upper travelling platform 7 of the reclaimer is higher than the height of the stacker travelling platform 6. This arrangement structure can also avoid cross-interference between the stacker 1 and the reclaimer 3 and can increase a utilization rate of the internal space of the material storage yard.

Any of those skilled in the art can modify or change the above embodiments without deviating from spirits and categories of the present invention. Therefore, all equivalent modifications or changes completed by ordinary intellectuals in the technical field without departing from spirits and technical thoughts revealed in the present invention shall still be covered by claims of the present invention.

It is noted that various individual features of the inventive processes and systems may be described only in one exemplary embodiment herein. The particular choice for description herein with regard to a single exemplary embodiment is not to be taken as a limitation that the particular feature is only applicable to the embodiment in which it is described. All features described herein are equally applicable to, additive, or interchangeable with any or all of the other exemplary embodiments described herein and in any combination or grouping or arrangement. In particular, use of a single reference numeral herein to illustrate, define, or describe a particular feature does not mean that the feature cannot be associated or equated to another feature in another drawing figure or description. Further, where two or more reference numerals are used in the figures or in the drawings, this should not be construed as being limited to only those embodiments or features, they are equally applicable to similar features or not a reference numeral is used or another reference numeral is omitted.

The foregoing description and accompanying drawings illustrate the principles, exemplary embodiments, and modes of operation of the systems, apparatuses, and methods. However, the systems, apparatuses, and methods should not be construed as being limited to the particular embodiments discussed above. Additional variations of the embodiments discussed above will be appreciated by those skilled in the art and the above-described embodiments should be regarded as illustrative rather than restrictive. Accordingly, it should be appreciated that variations to those embodiments can be made by those skilled in the art without departing from the scope of the systems, apparatuses, and methods as defined by the following claims.

What is claimed is:

1. An arrangement of a stacker and a reclaimer, comprising a stacker, a reclaimer, a stacker travelling track, a reclaimer travelling track, a material input conveyor, a material output conveyor, a material storage yard and a closed material storage shed, wherein the stacker and the material input conveyor are located under a highest portion of the reclaimer, and the reclaimer straddles over the stacker and the material input conveyor;

wherein the reclaimer travelling track comprises an upper travelling track of the reclaimer and a lower travelling track of the reclaimer; and wherein the upper travelling track of the reclaimer and the stacker travelling track are arranged on a same platform or respectively arranged on an upper platform and a lower platform.

2. The arrangement of the stacker and the reclaimer according to claim 1, wherein:

at least two groups of stacker travelling tracks and at least two stackers are arranged;

the arrangement comprises at least two material input conveyors, each corresponding to a respective on of the stackers;

each of the stackers is arranged on a respective group of the stacker travelling tracks;

each stacker is correspondingly provided with a respective material input conveyor;

the arrangement comprises a first reclaimer and a second reclaimer, the first reclaimer having a first upper traveling track and a first lower traveling track, and the second reclaimer having a second upper travelling track and a second lower travelling track;

the upper travelling tracks of the reclaimers are arranged between the groups of stacker travelling tracks; and each reclaimer straddles a respective stacker and material input conveyor.

3. The arrangement of the stacker and the reclaimer according to claim 1, wherein:

a main rack of the reclaimer straddles the stacker and the material input conveyor; and an upper end and a lower end of the main frame are respectively supported on the upper travelling track of the reclaimer and the lower travelling track of the reclaimer.

4. The arrangement of the stacker and the reclaimer according to claim 3, wherein:

the main rack comprises a vertical rack, an arch rack and an inclined rack connected sequentially;

the vertical rack is supported on the upper travelling track of the reclaimer;

the arch rack straddles above the stacker and the material input conveyor; and the inclined rack is supported on the lower travelling track of the reclaimer.

5. The arrangement of the stacker and the reclaimer according to claim 4, wherein the main rack has an arch shape or an inverted U shape.

6. The arrangement of the stacker and the reclaimer according to claim 1, wherein the lower travelling track of the reclaimer and the material output conveyor are arranged at a side edge of the material storage yard.

7. The arrangement of the stacker and the reclaimer according to claim 1, wherein the closed material storage shed is fully closed by a surface of a wall or closed by a wind-shield wall, a wind-shield plate and a windproof net with an aperture ratio.

8. An arrangement of a stacker and a reclaimer, comprising a stacker, a reclaimer, a stacker travelling track, a reclaimer travelling track, a material input conveyor, a material output conveyor, a material storage yard and a closed material storage shed, wherein the stacker and the material input conveyor are located under a highest portion of the reclaimer, and the reclaimer straddles over the stacker and the material input conveyor;
wherein the closed material storage shed is fully closed by a surface of a wall or closed by a wind-shield wall, a wind-shield plate and a windproof net with an aperture ratio.

9. The arrangement of the stacker and the reclaimer according to claim 8, wherein:
the reclaimer travelling track comprises an upper travelling track of the reclaimer and a lower travelling track of the reclaimer; and
the upper travelling track of the reclaimer and the stacker travelling track are arranged on a same platform or respectively arranged on an upper platform and a lower platform.

10. The arrangement of the stacker and the reclaimer according to claim 9, wherein:
at least two groups of stacker travelling tracks and at least two stackers are arranged;
the arrangement comprises at least two material input conveyors, each corresponding to a respective one of the stackers;
each of the stackers is arranged on a respective group of the stacker travelling tracks;
each stacker is correspondingly provided with a respective material input conveyor;
the arrangement comprises a first reclaimer and a second reclaimer, the first reclaimer having a first upper traveling track and a first lower traveling track, and the second reclaimer having a second upper travelling track and a second lower travelling track;
the upper travelling tracks of the reclaimers are arranged between the groups of stacker travelling tracks; and
each reclaimer straddles a respective stacker and material input conveyor.

11. The arrangement of the stacker and the reclaimer according to claim 9, wherein:
a main frame of the reclaimer straddles the stacker and the material input conveyor; and
an upper end and a lower end of the main frame are respectively supported on the upper travelling track of the reclaimer and the lower travelling track of the reclaimer.

12. The arrangement of the stacker and the reclaimer according to claim 11, wherein:
the main rack comprises a vertical rack, an arch rack and an inclined rack connected sequentially;
the vertical rack is supported on the upper travelling track of the reclaimer;
the arch rack straddles above the stacker and the material input conveyor; and the inclined rack is supported on the lower travelling track of the reclaimer.

13. The arrangement of the stacker and the reclaimer according to claim 12, wherein the main rack has an arch shape or an inverted U shape.

14. The arrangement of the stacker and the reclaimer according to claim 9, wherein the lower travelling track of the reclaimer and the material output conveyor are arranged at a side edge of the material storage yard.

15. The arrangement of the stacker and the reclaimer according to claim 8, wherein:
the reclaimer travelling track comprises an upper travelling track of the reclaimer and a lower travelling track of the reclaimer; and
the upper travelling track of the reclaimer and the stacker travelling track are arranged on a same platform or respectively arranged on an upper platform and a lower platform.

16. The arrangement of the stacker and the reclaimer according to claim 15, wherein:
at least two groups of stacker travelling tracks and at least two stackers are arranged;
the arrangement comprises at least two material input conveyors, each corresponding to a respective one of the stackers;
each of the stackers is arranged on a respective group of the stacker travelling tracks;
each stacker is correspondingly provided with a respective material input conveyor;
the arrangement comprises a first reclaimer and a second reclaimer, the first reclaimer having a first upper traveling track and a first lower traveling track, and the second reclaimer having a second upper travelling track and a second lower travelling track;
the upper travelling track of the reclaimers are arranged between the groups stacker travelling tracks; and
each reclaimer straddles a respective stacker and the material input conveyor.

17. The arrangement of the stacker and the reclaimer according to claim 16, wherein:
a main frame of the reclaimer straddles the stacker and the material input conveyor; and
an upper end and a lower end of the main frame are respectively supported on the upper travelling track of the reclaimer and the lower travelling track of the reclaimer.

* * * * *